(12) United States Patent
Kumagai et al.

(10) Patent No.: US 6,957,493 B2
(45) Date of Patent: Oct. 25, 2005

(54) AUTOMATIC TRACKING APPARATUS FOR REFLECTOR

(75) Inventors: Kaoru Kumagai, Tokyo (JP); Masahiro Saito, Tokyo (JP); Shinji Yamaguchi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 10/718,231

(22) Filed: Nov. 20, 2003

(65) Prior Publication Data

US 2004/0101163 A1 May 27, 2004

(30) Foreign Application Priority Data

Nov. 22, 2002 (JP) .............................. 2002-339345

(51) Int. Cl.[7] .......................... G01B 11/26; G01C 5/00
(52) U.S. Cl. ................. 33/290; 356/139.04; 250/203.2
(58) Field of Search .............................. 356/3.01, 3.09, 356/139.04, 139.05, 139.06, 141.1, 141.2, 356/141.3, 141.4, 4.01, 147; 250/201.8, 208.1, 250/203.1, 203.2; 33/290, 291, 292, 286

(56) References Cited

U.S. PATENT DOCUMENTS

| 4,713,533 | A | * | 12/1987 | Bremer et al. ............ 250/203.1 |
| 5,216,480 | A | * | 6/1993 | Kaneko et al. ......... 356/139.06 |
| 5,313,409 | A | * | 5/1994 | Wiklund et al. ............ 356/4.01 |
| 5,440,112 | A | * | 8/1995 | Sakimura et al. ......... 250/203.1 |
| 5,796,095 | A | * | 8/1998 | Matsuyama et al. ...... 250/208.1 |
| 6,455,831 | B1 | * | 9/2002 | Bandera et al. .......... 250/208.1 |
| 6,462,810 | B1 | * | 10/2002 | Muraoka et al. ....... 356/139.04 |
| 6,487,011 | B2 | * | 11/2002 | Donath et al. .............. 359/399 |
| 6,587,244 | B1 | * | 7/2003 | Ishinabe et al. ............ 356/4.01 |
| 2002/0040961 | A1 | * | 4/2002 | Okamoto et al. ......... 250/208.1 |

FOREIGN PATENT DOCUMENTS

JP          05-322569        12/1993     .......... G01C 15/00

* cited by examiner

Primary Examiner—R. Alexander Smith
(74) Attorney, Agent, or Firm—Chapman and Cutler LLP

(57) ABSTRACT

The present invention comprises an illumination portion (11), which is disposed in a surveying machine body (8), for illuminating measurement light toward a reflector (2), a light receiving portion (12), which is disposed in the surveying machine body (8), having an image sensor for receiving a reflection light image (M0) of the measurement light illuminated toward the reflector (2), arithmetic means (37) for calculating a position in an area (Q2) of the image sensor (27) for the reflection light image (M0) from the reflector, and a rotation mechanism for rotating the survey machine body (8) so as to position the reflector (2) on a light receiving optical axis (O2) of the light receiving portion (12) based on the position obtained by the arithmetic means (37), and a light receiving area (Q3) which is a smaller area than the area (Q2) of the image sensor (27) and has the light receiving optical axis (O2) as a center is provided in the area (Q2) of the image sensor (27).

7 Claims, 8 Drawing Sheets

AUTOMATIC TRACKING APPARATUS FOR REFLECTOR

FIELD OF THE INVENTION

The present invention relates to an automatic tracking apparatus for a reflector which illuminates measurement light toward a reflector, and seeks an arrival direction of the measurement light reflected on the reflector, and then tracks the reflector automatically.

DESCRIPTION OF THE RELATED ART

Conventionally, an automatic tracking apparatus for a reflector which comprises an eyepiece portion for collimating a corner cube as a reflector and a range finding portion for measuring a distance to the reflector, and scans the reflector in horizontal and vertical directions so as to track the reflector automatically by a surveying machine body has been well known. (For example, Japanese Patent Laid Open H05-322569)

Recently, for the request of lowering a price, there has been developed an automatic tracking apparatus for a reflector in which an illumination portion for illuminating measurement light toward a reflector and a light receiving portion having an image sensor such as a CCD for receiving a reflection light image of the measurement light illuminated toward the reflector are provided in a surveying machine body.

However, in this type of automatic tracking apparatus, light images from a head light of car and sunlight reflected on glasses other than the reflection light image from the reflector may be received in the image sensor, and it is hard for them to be distinguished from the reflection light image from the reflector because both of the light images are round, and then if a noise of light image other than the reflection light image is entered into the image sensor by a periphery environment, tracking of the reflector is disturbed.

SUMMARY OF THE INVENTION

The present invention has been made in view of aforementioned problem, it is, therefore, an object of the present invention to provide an automatic tracking apparatus for a reflector even thought an illumination portion for illuminating a measurement light toward a reflector and a light receiving portion having an image sensor for receiving a reflection light image of the measurement light illuminated toward the reflector are provided in a surveying machine body, the automatic tracking apparatus can carry out tracking without being disturbed.

According to a first aspect of the present invention, an automatic tracking apparatus comprises an illumination portion disposed in a surveying machine body for illuminating a measurement light toward a reflector, a light receiving portion, which is also disposed in the surveying machine body, and which has an image sensor for receiving a reflection light image of the measurement light illuminated toward said reflector, arithmetic means for calculating a position of the reflection light image from the reflector in the image sensor area, and a rotation mechanism for rotating the surveying machine body so as to position the reflector on a light receiving optical axis of the light receiving portion based on the position obtained by the arithmetic means.

A light receiving area which is a smaller area than an area of the image sensor area and has said light receiving optical axis as a center is provided in the image sensor area.

According to a second aspect of the present invention, in the automatic tracking apparatus for the reflector, the area of the light receiving area is changed in accordance with a distance from the reflector to the surveying machine body.

According to a third aspect of the present invention, in the automatic tracking apparatus for the reflector, the light receiving area comprises a first light receiving area and a second light receiving area which surrounds the first light receiving area and has a larger area than the first light receiving area.

According to a fourth aspect of the present invention, in the automatic tracking apparatus for the reflector, when a reflection light image of the reflector does not exist in the first light receiving area, the reflection light image of the reflector is detected in the second light receiving area, and when the reflection light image of the reflector does not exist in the second light receiving area, the reflection light image is detected in the image sensor area.

According to a fifth aspect of the present invention, in the automatic tracking apparatus for the reflector, a range of the second light receiving area is set within a range in which the surveying machine body is rotated in horizontal and vertical directions by the rotation mechanism within a scanning time for one field of the image sensor.

According to a sixth aspect of the present invention, in the automatic tracking apparatus for the reflector, the arithmetic means comprises a storing position for storing a position of the reflection light image and a position of a light image other than the reflection light image, and when the light image other than the reflection light image is in the second light receiving area, the arithmetic means distinguishes between the position of the reflection light image and the position of light image other than the reflection light image.

According to a seventh aspect of the present invention, in an automatic tracking apparatus for the reflector, the storing portion stores a size and a shape of the reflection light image, and the arithmetic means specifies the reflector based on the size and the shape of the reflector light image, as well as said position.

DESCRIPTION OF THE PREFERED EMBODIMENTS (Embodiment 1)

Figure 1:
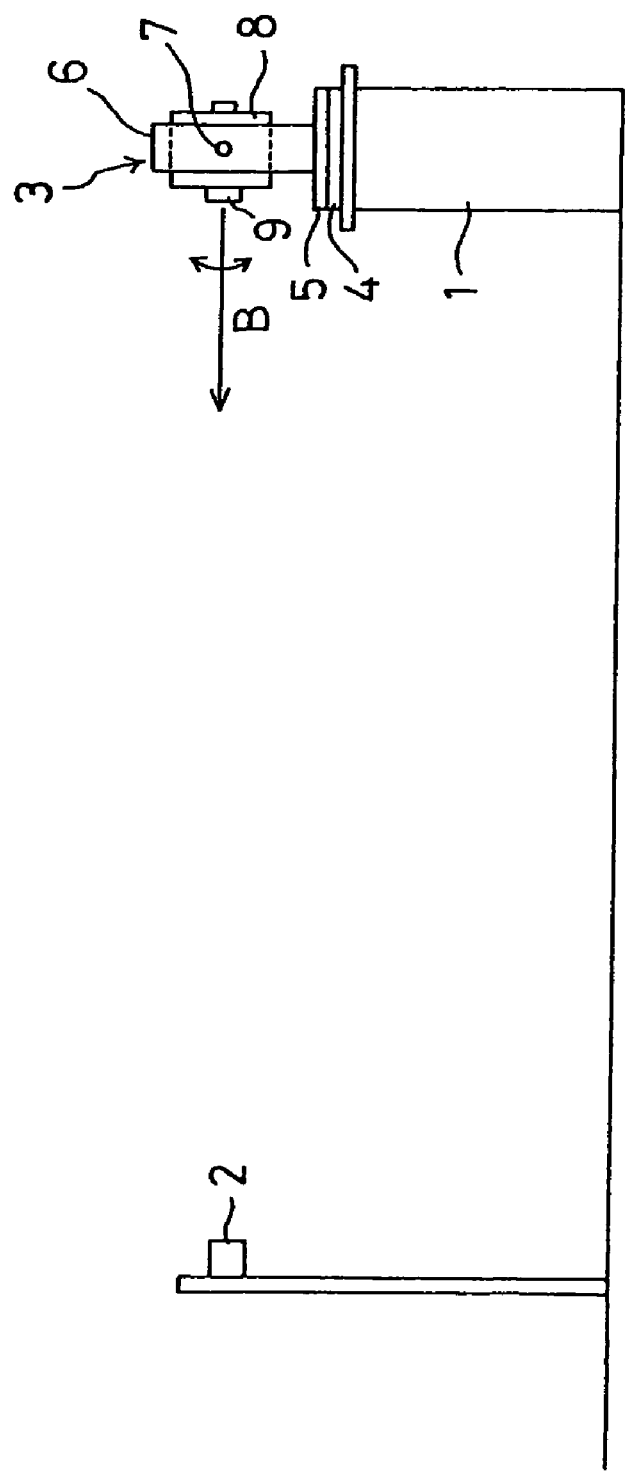
FIG. 1 is a side view showing a setting condition of an automatic tracking apparatus for a reflector according to the present invention.

In FIG. 1, reference numeral 1 denotes a surveying pedestal and reference numeral 2 a corner cube as a reflector placed at a point to be measured. This surveying pedestal 1 is provided with a surveying machine 3. This surveying machine 3 comprises a fixing board 4 and a horizontal rotation portion 5. The fixing board 4 is provided with a known rotation mechanism (not shown) for rotating the horizontal rotation portion 5.

Figure 2:
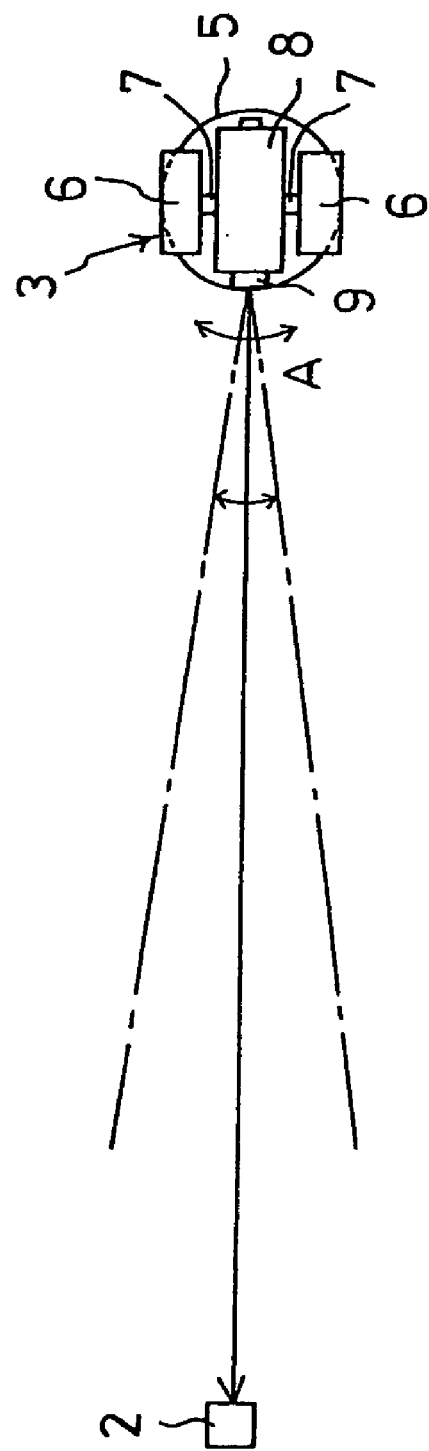
FIG. 2 is a plan view showing a setting condition of an automatic tracking apparatus for a reflector according to the present invention.

As shown in FIG. 2, the horizontal rotation portion 5 is rotated in the direction of arrow A relative to the fixing board 4. The horizontal rotation portion 5 comprises a supporting portion or carrying portion 6. A vertical direction rotation shaft 7 is mounted on the supporting portion 6, and a known rotation mechanism (not shown) for rotating the vertical direction rotation shaft 7 is provided in the inside of the supporting portion 6. A surveying machine body 8 is mounted on the vertical direction rotation shaft 7. The surveying machine body 8 is rotated in the horizontal direction by a rotation of the horizontal rotation portion 5, and also is rotated in the vertical direction by a rotation of the vertical direction rotation shaft 7 shown by the arrow B in FIG. 1.

Figure 3:
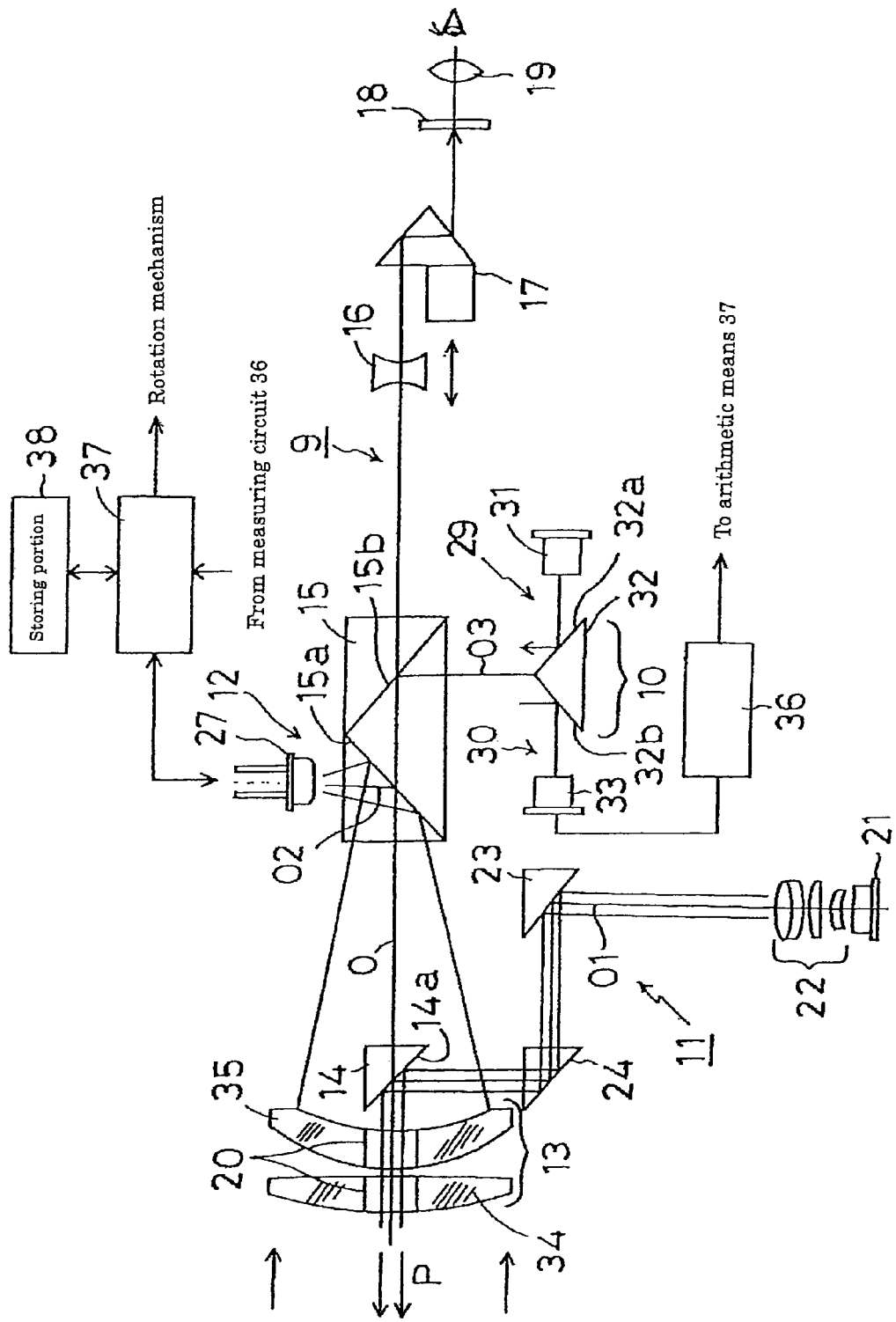
FIG. 3 is an explanation view showing an optical portion of an automatic tracking apparatus for a reflector according to the present invention.

In the surveying machine body 8, as shown in FIG. 3, there are provided with a collimation optical portion 9, a distance measuring optical portion 10, an illumination portion 11, and a light receiving portion 12. The collimation optical portion 9 is for collimating the corner cube 2, and comprises an objective lens 13, a reflection mirror 14, a dichroic prism 15, a focusing lens 16, a Porro prism 17, a focal point mirror 18, and an eyepiece 19.

The objective lens 13 includes a penetration part 20. The reflection mirror 14 constructs part of the illumination portion 11. The illumination portion 11 comprises a laser diode 21, a collimator lens 22, and reflection mirrors 23, 24. The laser diode 21 ejaculates an infrared laser beam P (900 nm of wave length) as measurement light, and the infrared laser beam P is changed to a parallel pencil by the collimator lens 22.

Figure 4:
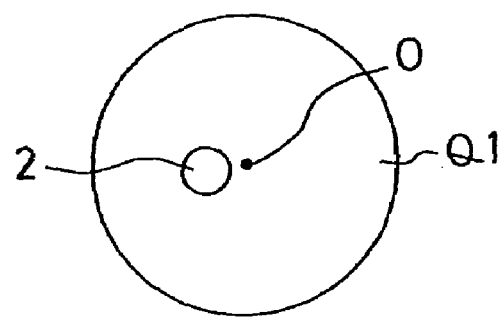
FIG. 4 is a view showing an example of an illumination area of measurement light by an illumination portion according to the present invention.

The reflection mirror 14 is one for bringing an optical axis O1 of the illumination portion 11 into line with an optical axis O, and has a reflection face 14a. The infrared laser beam P is reflected on the reflection mirrors 23, 24, and is led to the objective lens 13, and then is emitted to an outside through the penetration portion 20, and is illuminated toward the corner cube 2. FIG. 4 shows an illumination area Q1 of the infrared laser beam P.

The infrared laser beam P which is reflected on the corner cube 2 is condensed by the whole area of the objective lens 13, and is led to the dichroic prism 15. The dichroic prism 15 includes reflection faces 15a, 15b.

The reflection face 15a reflects the infrared laser beam P toward the light receiving portion 12. The light receiving portion 12 comprises an image sensor 27. An optical axis O2 of the light receiving portion 12 is aligned with the optical axis O of the objective lens 13.

The distance measuring portion 10 is composed of a light projecting system 29 and a light receiving system 30, and the light projecting system 29 includes a laser light source 31 and the light receiving system 30 includes a photosensitive device 33. A triangle prism 32 is disposed between the light projecting system 29 and the light receiving system 30. The laser light source 31 emits an infrared laser light wave as a distance measuring luminous flux. A wave length of its infrared laser light wave is 800 nm, and the wave length is different from the wave length of the infrared laser light P.

The infrared laser light wave is reflected on a reflection face 32a of the triangle prism 32, and is led to the reflection face 15b of the dichroic prism 15. This reflection face 15b transmits light of a visualized area, and reflects light of an infrared area including light with a wavelength of 800 nm.

The infrared laser light wave which is led to the reflection face 15b is emitted as a plane wave to the outside of the surveying machine body 8 by passing through a lower half area 34 of the objective lens 13 after transmitting the reflection face 15a. The infrared laser light wave is reflected on the corner cube 2, and returns to the objective lens 13, and is condensed by an upper half area 35 of the objective lens 13. After that, the infrared laser light wave is led to the reflection face 15b after transmitting the reflection face 15a of the dichroic prism 15, and then is led to a reflection face 32b of the triangle prism 32 by this reflection face 15b, and is reflected on this reflection face 32b, and then is converged on the photosensitive device 33.

An output of light receiving of the photosensitive device 33 is input in a known measuring circuit 36, and the measuring circuit 36 calculates a distance from the surveying machine body 8 to the corner cube 2. The distance from the surveying machine body to the corner cube 2 is thereby measured.

A luminous flux of a visualized area is led to the focal point mirror 18 through the objective lens 13, the dichroic prism 15, the focusing lens 16, and the Porro prism 17, and including a vicinity of the corner cube 2, an image of the vicinity is formed on the focal point mirror 18 by adjusting the focusing lens 16. A worker can collimate the corner cube 2 by looking into a visualized image, which is imaged on the focal point mirror 18 through the eyepiece 19.

Figure 5:
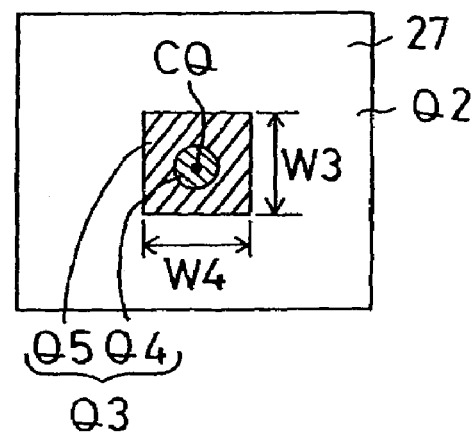
FIG. 5 is an explanation view showing an example of an image sensor according to the present invention.
Figure 6:
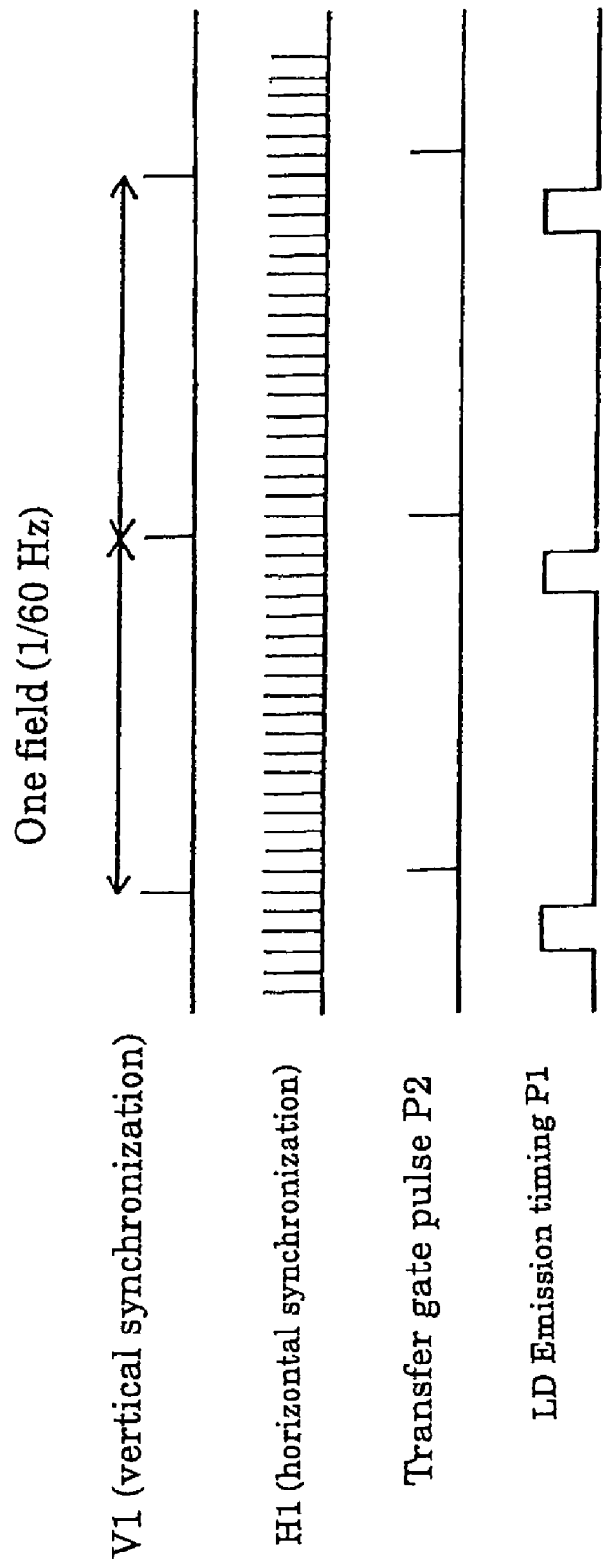
FIG. 6 is a timing chart for explaining timing for taking a signal out from an image sensor according to the present invention.

The image sensor 27 comprises an area Q2 shown in FIG. 5, and a plurality of pixels is provided in this area Q2. The image sensor 27 is scanned by arithmetic means 37 shown in FIG. 3, and when the laser diode 21 is emitted by an emission timing pulse signal P1 shown in FIG. 6, each of the pixels in the image sensor 27 is scanned based on a vertical synchronization signal V1 and a horizontal synchronization signal H1 among the vertical synchronization signals V1. A transfer gate pulse signal P2 is output slightly later than the vertical synchronization signal V1. Light receiving signals of each pixel are thereby loaded into the arithmetic means 37.

In the image sensor 27, a light receiving area Q3 having a smaller area than the area of the area Q2 is provided in the area Q2. This light receiving area Q3 is disposed so as to have the optical axis O2 of the light receiving portion 12 as a center. This light receiving area Q3 is composed of a first circular light receiving area Q4 and a second rectangular light receiving area Q5 which surrounds this light receiving area Q4 having a larger area than the first light receiving area Q4. The arithmetic means 37 has a role for setting up the light receiving areas Q4, Q5 of the image sensor 27.

The areas of the light receiving areas Q4, Q5 are changed in accordance with a distance from the surveying machine body 8 to the corner cube 2, and measured distance data from the measuring circuit 36 are input in the arithmetic means 37, and then the arithmetic means 37 changes the areas of the light receiving areas Q4, Q5 based on the measured distance data of the measuring circuit 36.

Moreover, without using the measured distance data from the measuring circuit 36, it is possible to set up a size of light receiving area Q5 by judging a distance from a size of received light image corresponding to Q4.

Figure 7:
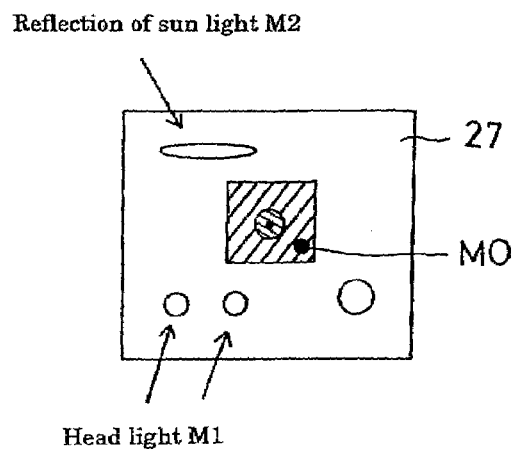
FIG. 7 is an explanation view showing an example of varied light images loaded into an image sensor.

As shown in FIG. 7, in accordance with an environmental condition, when light images such as a projection light image M1 from a head light and a reflection light image M2 of sunlight from a bicycle other than a reflection light image M0 from the corner cube 2 are received in the image sensor 27, it is hard to distinguish between the reflection light image M0 and the other light images of M1 and M2. However, a reflector as an object to be tracked, i.e., a reflection light image from the corner cube 2 is assumed to be on the light axis O2 approximately during tracking, therefore, if the reflection light image from the reflector is detected by scanning within the light receiving areas Q4, Q5, a light image other than the reflection light image by the reflector can not be misjudged as the object to be tracked.

The arithmetic means 37 comprises a function for setting up the light receiving areas Q4, Q5 and a function for changing these areas corresponding to a distance. It is desirable that the area of the light receiving area Q4 is set to be a slightly larger than an area of a reflector. It is desirable that a distance of horizontal direction and a distance of vertical direction in the light receiving area Q5 are set to be within an angle required for rotating of the surveying machine body 8 in horizontal direction or vertical direction by a rotation mechanism in the scanning period (sixteenth per second) of one field of image sensor 27.

In other words, as shown in FIG. 5, in the surveying machine body 8, when a rotation angle speed in a horizontal direction is $\omega 1$, a rotation angle speed in a vertical direction is $\omega 2$, and a focal point length of the light receiving system 12 is f, the distance in the horizontal direction W3 and the distance in the vertical direction W4 of the light receiving area Q5 are $$W3 = f \cdot \omega 1/60$$

$$W4 = f \cdot \omega 2/60$$

As described-above, a reason for limiting the light receiving area Q5 is for improving a tracking efficiency which can be achieved by avoiding unnecessary tracking because there is a limit for a rotation angle speed $\omega$ of the surveying machine body 8 by the rotation mechanism, and a reflector which moves faster than the rotation angle speed $\omega$ of this surveying machine body can not be tracked.

Figure 9:
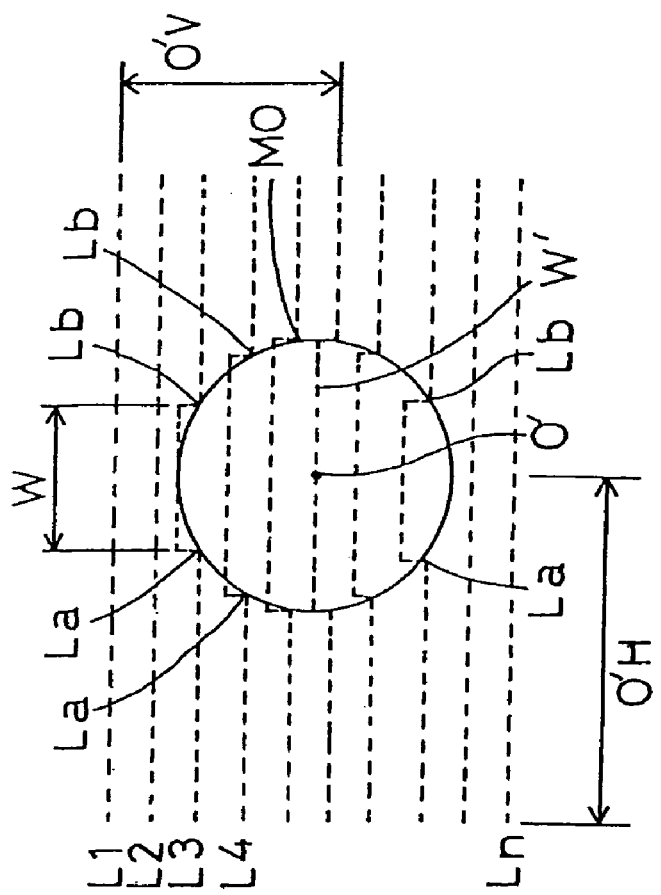
FIG. 9 is an explanation view showing an example for a detecting method of the reflection light image which is reflected on the image sensor.

In the reflection light image M0 by the reflector, by using the arithmetic means 37 for a respective field, as shown in FIG. 9, each pixel in the image sensor 27 is scanned in the horizontal direction, and a beginning edge La and an end edge Lb of the reflection light image M0 for each of horizontal scanning lines L1 to Ln are detected, and these positions and each distance W of each of horizontal scanning lines from the beginning edge La to the end edge Lb are stored in a storing portion 38, and then a center position O' in the reflection light image M0 is obtained by the arithmetic means 37.

A position of the reflection light image M0 is substantially obtained, for example, the longest distance W' among the distances W of each horizontal scanning line from the beginning edge La to the end edge Lb is set to be a half of its width W' in the vertical direction L for a center position O'V and in the horizontal direction H for a center position O'H.

When a plurality of reflectors exists in the area of the image sensor 27, the arithmetic means 37 recognizes a light image existing in the light receiving area Q4 as a reflection light image from a reflector, and detects a position of the reflection light image, and then the reflection light image is tracked. When the reflection light image does not exist in the light receiving area Q4, by conducting a detection of a reflector from a difference among fields after turning on or turning off a laser light source (Japanese Patent Laid-Open H07-198383), a light image existing in the light receiving area Q5 is recognized as an image by the reflection light image from the reflector, and a position of the reflector is detected, and then the reflector is tracked. When the reflection light image does not exist in the light receiving area Q5, a light image existing in the area Q2 of the image sensor 27 is recognized as the reflection light image from the reflector, and a position of the reflector is detected, and then the reflector is tracked.

Figure 10:
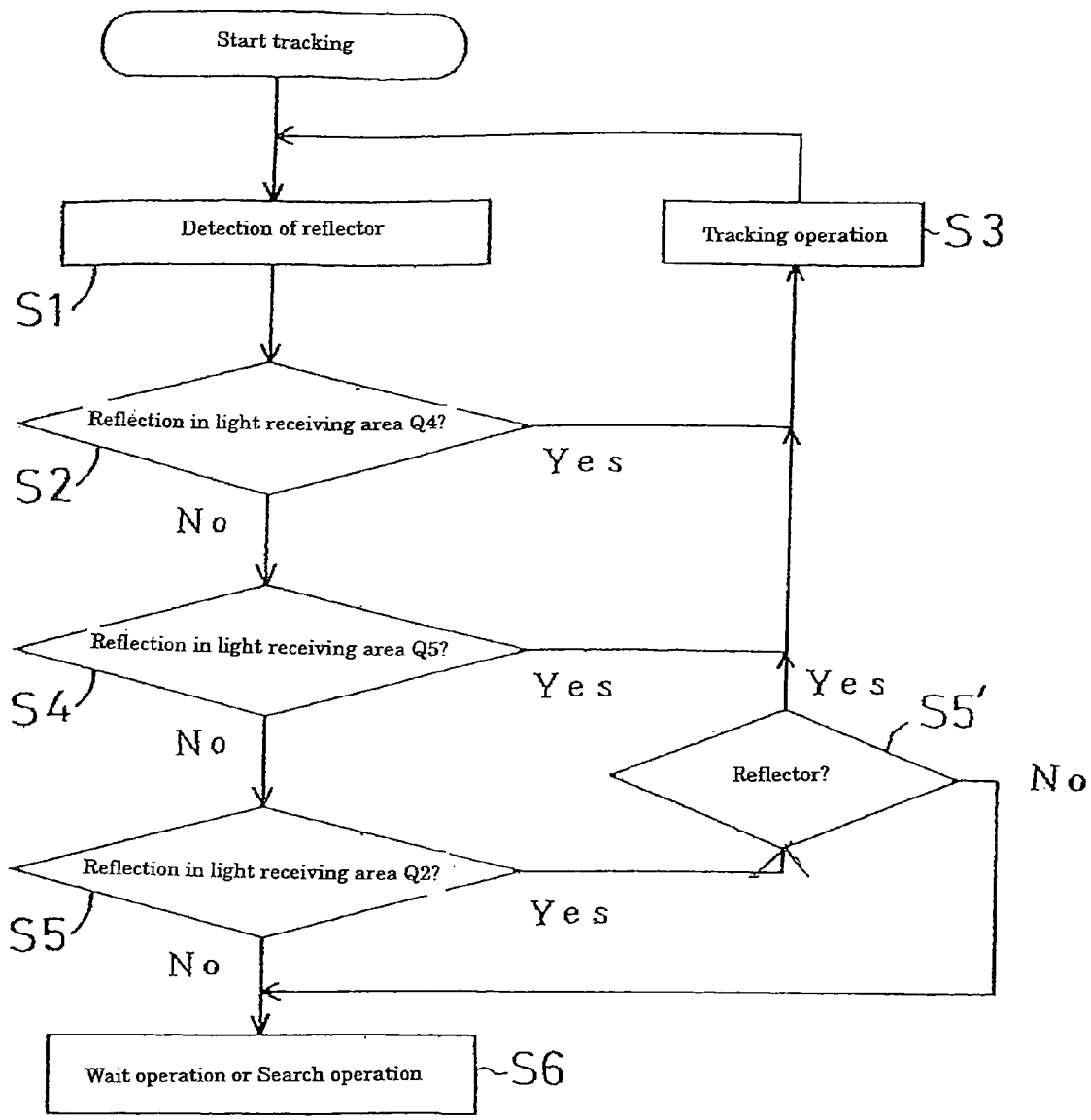
FIG. 10 is a flow chart for explaining a tracking flow of an automatic tracking apparatus for a reflector according to the present invention.

Hereinafter, tracking steps of a reflector will be explained in accordance with a flow chart shown in FIG. 10.

When the arithmetic means 37 enters a reflector tracking flow, at first, the arithmetic means 37 judges whether or not a reflection light image from a reflector is existed on one horizontal scanning line within the area Q2 of the image sensor (S. 1).

This operation for judging whether or not the reflection light image exists on one horizontal scanning line within the area Q2 is conducted for one field, and when the reflection light image from the reflector does not exist in one field, processing for detecting a reflector is conducted repeatedly for each field. When the reflection light image exists in one field, it is judged whether or not the reflection light image exists in the light receiving area Q4 (S. 2), and when the reflection light image exists in the light receiving area Q4, the surveying machine body 8 is rotated with tracking so as to position the reflection light image at the image center CQ (FIG. 5) (S. 3). When the reflection light image does not exist in the light receiving area Q4, it is judged whether or not the reflection light image exists in the light receiving area Q5 (S. 4), and if the reflection light image exists in the light receiving area Q5, the surveying machine body 8 is rotated with tracking so as to position the reflection light image at the image center CQ (S. 3) When the reflection light image does not exist in the light receiving area Q5, it is judged whether or not the reflection light image exists in the area Q2 of the image sensor 27 (S. 5), and if the reflection light image exists in the area Q2 of the image sensor 27, there is a possibility that a maximum acceleration of a surveying machine is exceeded, so a test for judging whether or not the light image is the reflector 2 is carried out (S. 5'), and when the light image is the reflector 2, the surveying machine body 8 is rotated with tracking so as to position the reflection light image at the image center CQ. If the light image is not the reflector, a step goes to a wait operation or a search operation.

If the reflection light image does not exist in the area Q2 of the image sensor 27, the wait operation (stop tracking) is conducted or the search operation is conducted (S. 6). Moreover, in a condition where the reflection light image does not exist in the area Q2 of the image sensor 27, there are cases where a light shielding object crosses between a reflector and a surveying machine body or a reflector moves faster than a rotation angle speed of a surveying machine body.

By conducting such tracking processing, a tracking efficiency of reflector can be increased, and a misjudgment of reflector can be avoidable.

(Embodiment 2)

Figure 8:
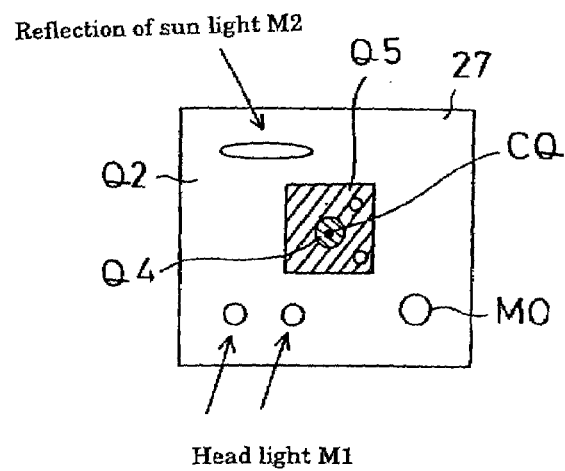
FIG. 8 is an explanation view for explaining a size and a shape of a reflection light image, which are reflected on the image sensor, and the position thereof, and for explaining positions of light images other than the reflection light image.

In this embodiment 2, as shown in FIG. 8, positions of light images such as M1 and M2 other than a reflector which exist in the area Q2 of image sensor 27, and a size and a shape of a reflection light image M0 are stored in the storing portion 38, and by the arithmetic means 37, the reflector is specified from a positional relationship between a position of the reflection light image M0 and the light images M1, M2 other than the reflection light images M0 or the shape and size of the reflection light image M0.

Following advantages will be obtained by construing as mentioned above.

For example, during tracking a reflector, if the reflector is shielded by a light shielding object, and the reflector is moved during that time, and if an object such as a headlight and an electric light other than the reflector exists in the light receiving area Q5, there is a possibility that the head light the electric light or the like is misjudged as the reflector for the object to be tracked, however, the reflector can be specified by a positional relationship between the position of the reflector and the position of the object other than the reflector, and the shape and the size of the reflector, so the possibility for misjudging the object other than the reflector as the reflector can be decreased.

Especially, when the reflection light image M0 from a reflector exists in the light receiving area Q4, and the size and the shape thereof are stored in the storing portion 38, and by the arithmetic means 37, a misjudgment for recognizing the object other than the reflector as the reflector can be reduced if the reflector is judged by comparing the shape and the size stored in the storing portion 38 with each of light images and the size detected in the areas Q2, Q5 of the image sensor 27.

According to the present invention, an automatic tracking apparatus for a reflector, even though an illumination portion for illuminating measurement light toward a reflector and a light receiving portion having an image sensor for receiving a reflection light image of the measurement light illuminated toward the reflector are provided in a surveying machine body, tracking can be carried out without being disturbed.

Especially, according to a second aspect of the present invention, an area of a light receiving area is changed in accordance with a distance from a surveying machine body to a reflector, in other words, when the distance is short, the area of light receiving area is adopted to be a broader area, and when the distance is long, the area of light receiving area is adopted to be a smaller area, so a probability for misjudging a light image other than a reflection light image from a reflector as the reflector is decreased.

According to the third and fourth aspects of the present invention, a light receiving area is constructed by a first area and a second area which surrounds the first area, and a tracking range for a reflector is sequentially broadened from a small area to a large area, so a tracking efficiency and detecting efficiency of reflector can be improved.

According to a fifth aspect of the present intention, it is possible to avoid unnecessary tracking.

In other words, a surveying machine body is rotated at a predetermined angular speed by a rotation mechanism, and a reflector is thereby tracked. However, the surveying machine body can not track an object which moves faster than this predetermined angler speed, so in order, to avoid unnecessary tracking, a range of a second light receiving area is adopted to be within a range in which the rotation mechanism rotates the surveying machine in a vertical direction and in a horizontal direction during a scanning time for one field.

According to a sixth and a seventh aspects of the present invention, a reflector is tracked with high accuracy.

What is claimed is:

1. An automatic tracking apparatus for a reflector, comprising:
    a surveying machine body;
    an illumination portion disposed in said surveying machine body for illuminating a measurement light toward a reflector;
    a light receiving portion which is disposed in said surveying machine body and which has an image sensor including a plurality of pixels for receiving a reflection light image of the measurement light illuminated toward said reflector;
    an arithmetic device configured to calculate a position of the reflection light image from said reflector in an area of said image sensor;
    a rotation mechanism for rotating said surveying machine body so as to position said reflector on a light receiving optical axis of said light receiving portion based on the position obtained by said arithmetic device; and
    a distance measuring portion for measuring a distance from the reflector to the surveying machine body,
    wherein the area of the image sensor is provided with a first light receiving area, which is set to be larger than the reflection light image, and a second light receiving area surrounding the first light receiving area, as scanning areas of the reflection light image, and
    areas of the first light receiving area and the second light receiving area are changed in accordance with the distance from the reflector to the surveying machine body.

2. The automatic tracking apparatus for a reflector according to claim 1, wherein a range of said second light receiving area is set within a range of a rotation angle in a horizontal direction and a rotation angle in a vertical direction rotated by said rotation mechanism within a scanning time for one field of said image sensor.

3. The automatic tracking apparatus for a reflector according to claim 1, wherein said arithmetic device comprises a storing portion for storing a position of said reflection light image and a position of a light image other than said reflection light image, and when the light image other than said reflection light image exists in said second light receiving area, said arithmetic device distinguishes between the position of said reflection light image and the position of the light image other than said reflection light image.

4. The automatic tracking apparatus for a reflector according to claim 3, wherein said storing portion stores a size and a shape of said reflection light image, and said arithmetic device specifies the reflector based on the size and the shape of said reflection light image as well as said position.

5. An automatic tracking apparatus for a reflector comprising:
    a surveying machine body;
    an illumination portion disposed in said surveying machine body for illuminating a measurement Light toward a reflector;
    a light receiving portion which is disposed in said surveying machine body and which has an image sensor for receiving a reflection light image of the measurement light illuminated toward said reflector;
    an arithmetic device configured to calculate a position of the reflection light image from said reflector in an area of said image sensor; and
    a rotation mechanism for rotating said surveying machine body so as to position said reflector on a light receiving optical axis of said light receiving portion based on the position obtained by said arithmetic device, wherein the area of the image sensor is provided with a first light receiving area, which is set to be larger than the reflection light image, having said light receiving optical axis of the light receiving portion as a center, and a second light receiving area surrounding the first light receiving area, and an area of the second light receiving area is set by judging a distance from a size of the reflection light image.

6. The automatic tracking apparatus for a reflector according to claim 5, wherein said arithmetic device comprises a storing portion for storing a position of said reflection light image and a position of a light image other than said reflection light image, and when the light image other than said reflection light image exists in said second light receiving area, said arithmetic device distinguishes between the position of said reflection light image and the position of the light image other than said reflection light image.

7. The automatic tracking apparatus for a reflector according to claim 6, wherein said storing portion stores a size and a shape of said reflection light image, and said arithmetic device specifies the reflector based on the size and the shape of said reflection light image as well as said position.

* * * * *